United States Patent
Terazawa et al.

(10) Patent No.: US 10,923,756 B2
(45) Date of Patent: Feb. 16, 2021

(54) JOINING STRUCTURE

(71) Applicant: NGK INSULATORS, LTD., Nagoya (JP)

(72) Inventors: Genta Terazawa, Nagoya (JP); Masato Fukumori, Kasugai (JP); Yuki Tanaka, Nagoya (JP); Takashi Ryu, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/924,641

(22) Filed: Jul. 9, 2020

(65) Prior Publication Data

US 2020/0343574 A1    Oct. 29, 2020

Related U.S. Application Data (63) Continuation of application No. PCT/JP2019/037970, filed on Sep. 26, 2019.

(30) Foreign Application Priority Data

Dec. 27, 2018 (JP) ................................ 2018-245474
Mar. 8, 2019 (JP) ................................ 2019-042860

(51) Int. Cl.
*H01M 8/02* (2016.01)
*H01M 8/2485* (2016.01)

(52) U.S. Cl.
CPC ................................ *H01M 8/2485* (2013.01)

(58) Field of Classification Search
CPC ..... C03C 10/00–16; C03C 8/24; C03C 27/02; H01M 8/2485
See application file for complete search history.

(56) References Cited

U.S. PATENT DOCUMENTS

2020/0083545 A1    3/2020  Sato et al.

FOREIGN PATENT DOCUMENTS

| JP | 2005-100687 A | 4/2005 |
| JP | 2016-42457 A | 3/2016 |

(Continued)

OTHER PUBLICATIONS

Notice of Reasons for Refusal with English Translation issued in corresponding Japanese Application JP 2019-042860 dated Apr. 23, 2019 (7 pages).

(Continued)

*Primary Examiner* — Cynthia K Walls
(74) *Attorney, Agent, or Firm* — Flynn Thiel, P.C.

(57) ABSTRACT

A joining structure includes a first bonded member and a glass portion that is bonded to a surface of the first bonded member. The glass portion includes an interface region not exceeding 5 μm of the surface of the first bonded member, and an inner region more than 5 μm from the surface of the first bonded member. The interface region and inner region respectively include rod-shaped crystal particles that have three or more aspect ratios when viewed in cross section. An average orientation angle of the rod-shaped crystal particles included in the interface region is greater than or equal to 60 degrees and less than or equal to 120 degrees. A standard deviation of the orientation angle of the rod-shaped crystal particles included in the inner region is greater than a standard deviation of the orientation angle of the rod-shaped crystal particles included in the interface region.

3 Claims, 5 Drawing Sheets

(56) References Cited

FOREIGN PATENT DOCUMENTS

| | | |
|---|---|---|
| JP | 2017-45701 A | 3/2017 |
| WO | 2018/097174 A1 | 5/2018 |

OTHER PUBLICATIONS

International Search Report with English Translation issued in corresponding International Application No. PCT/JP2019/037970 dated Dec. 3, 2019 (4 pages).
Written Opinion of International Searching Authority with English Translation issued in corresponding International Application No. PCT/JP2019/037970 dated Dec. 3, 2019 (6 pages).

JOINING STRUCTURE

CROSS-REFERENCE TO RELATED APPLICATIONS

This is a continuation of PCT/JP2019/037970, filed Sep. 26, 2019, which claims priority from Japanese Application No. 2018-245474, filed Dec. 27, 2018, and Japanese Application No. 2019-042860, filed Mar. 8, 2019 the entire contents of which are hereby incorporated by reference.

TECHNICAL FIELD

The present invention relates to a joining structure.

BACKGROUND ART

Typically, a fuel cell stack in a fuel cell includes a fuel cell, a manifold configured from a metal, and a glass portion configured from crystalline glass (see JP 2005-100687A).

The manifold includes a through hole for insertion of a fuel cell. The glass portion is bonded to the fuel cell and the manifold.

The glass portion prevents mixture of air with fuel gas by partitioning an inner space (for example, space supplied with fuel gas) and an outer space (for example, space supplied with air) in the manifold.

SUMMARY

Technical Problem

During operation of a fuel stack, thermal stress associated with thermal expansion and thermal contraction of the manifold is produced in the glass portion, and results in a tendency for cracks to form in proximity to the interface of the manifold with the glass portion. When such cracks are further expanded by thermal stress, connecting passages are formed between the inner space and outer space of the manifold and results in the possibility of mixing of fuel gas and air.

The present invention has the object of providing a joining structure that enables suppression of crack formation in the glass portion.

Solution to Problem

The joining structure according to the present invention includes a first bonded member and a glass portion that is bonded to a surface of the first bonded member. The glass portion includes an interface region not exceeding 5 μm of the surface of the first bonded member, and an inner region more than 5 μm from the surface of the first bonded member. The interface region and inner region respectively include rod-shaped crystal particles that have three or more aspect ratios when viewed in cross section. An average orientation angle of the rod-shaped crystal particles included in the interface region is greater than or equal to 60 degrees and less than or equal to 120 degrees. A standard deviation of the orientation angle of the rod-shaped crystal particles included in the inner region is greater than a standard deviation of the orientation angle of the rod-shaped crystal particles included in the interface region.

Advantageous Effects

The present invention provides a joining structure that enables suppression of crack formation in the glass portion.

DESCRIPTION OF EMBODIMENTS

Configuration of Fuel Cell Stack

Figure 1:
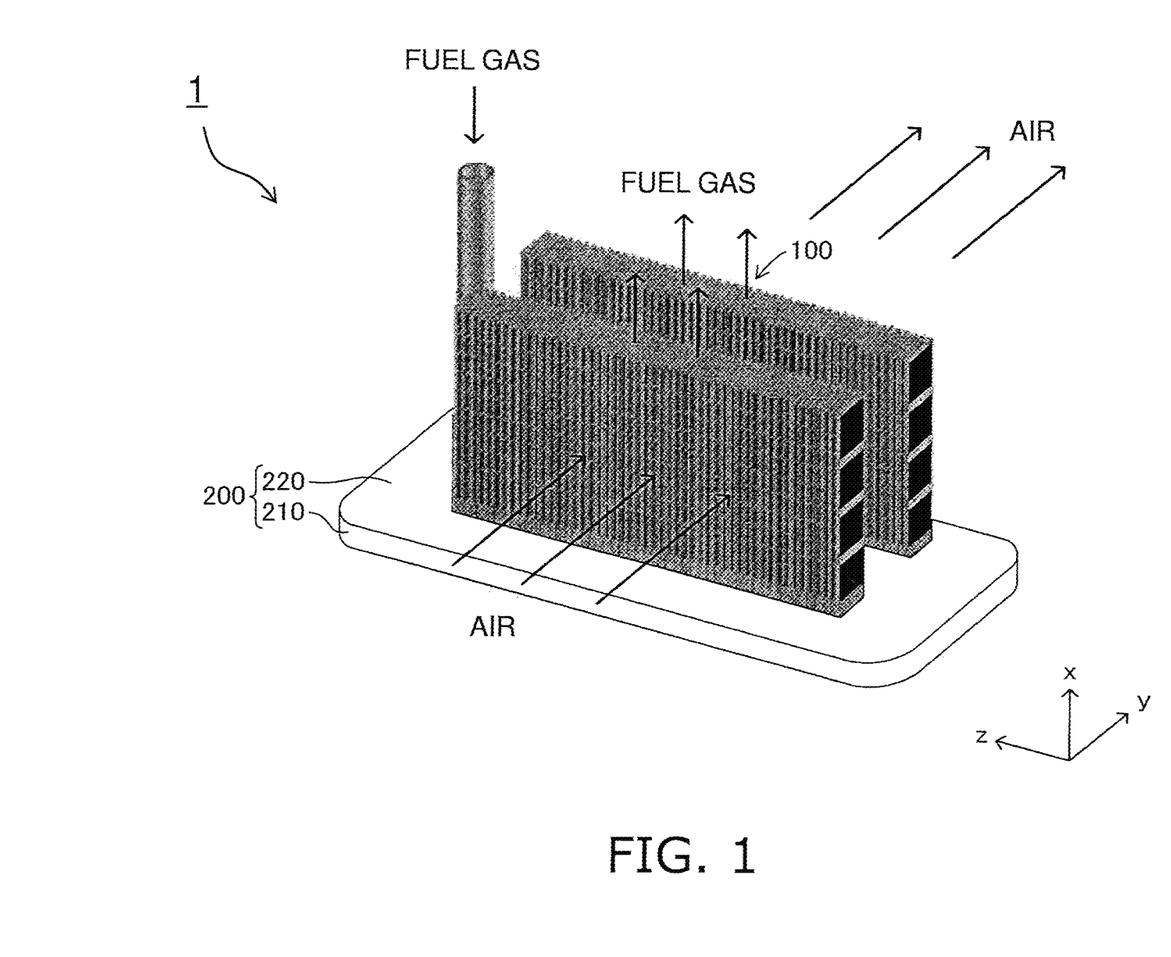
FIG. 1 is an overall perspective view of a fuel cell stack according to an embodiment of the present invention.
Figure 2:
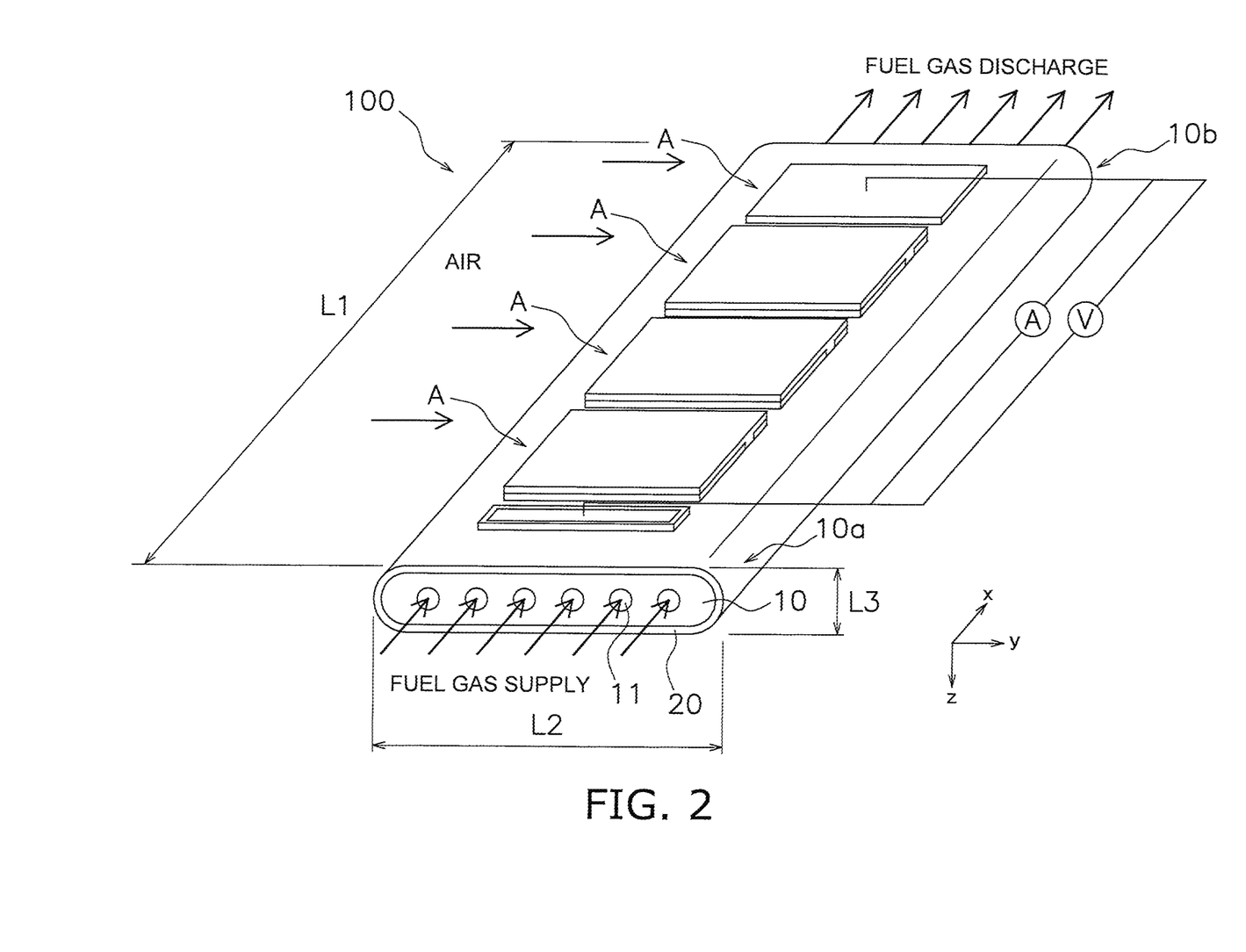
FIG. 2 is an overall perspective view of a fuel cell.
Figure 3:
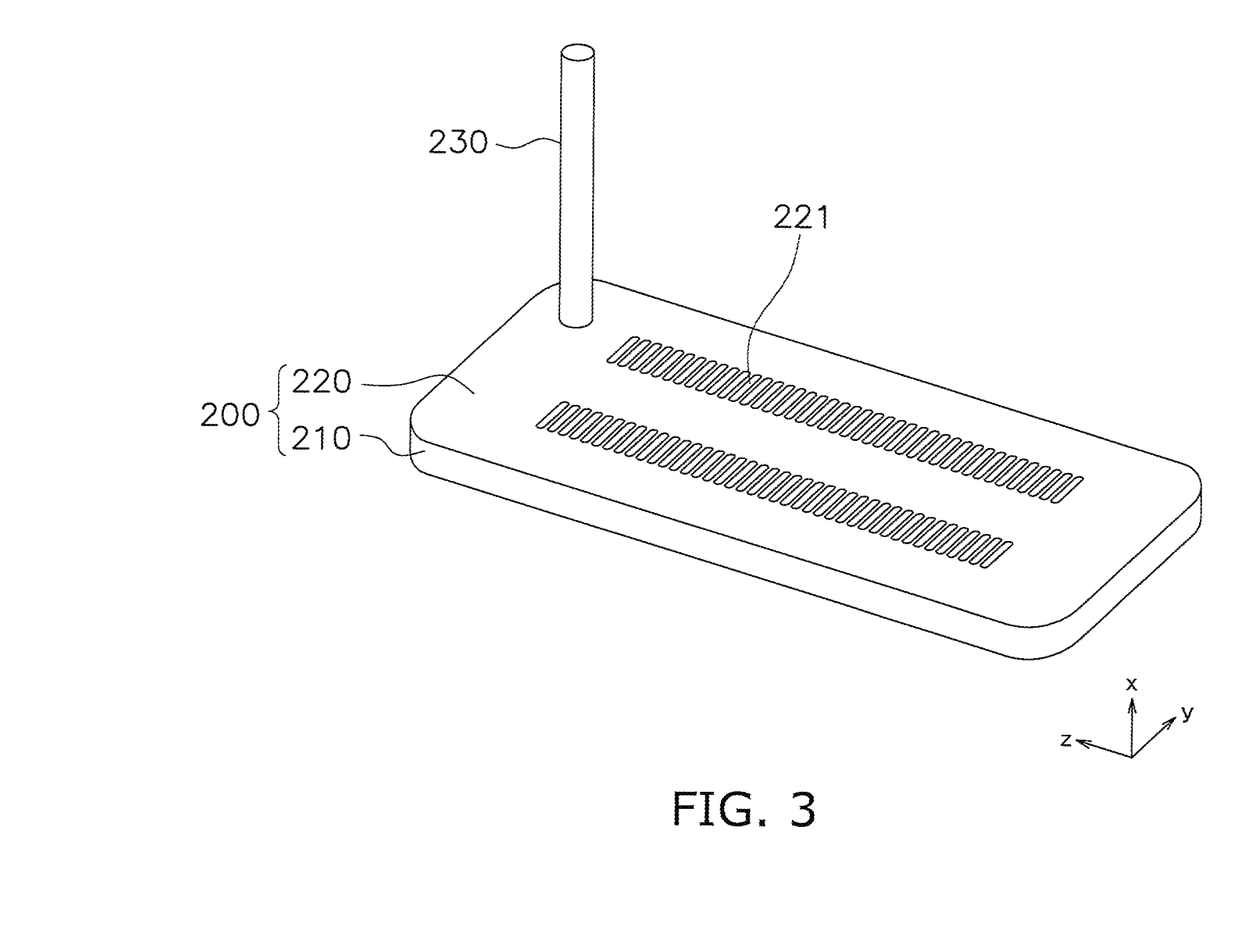
FIG. 3 is an overall perspective view of a manifold.
Figure 4:
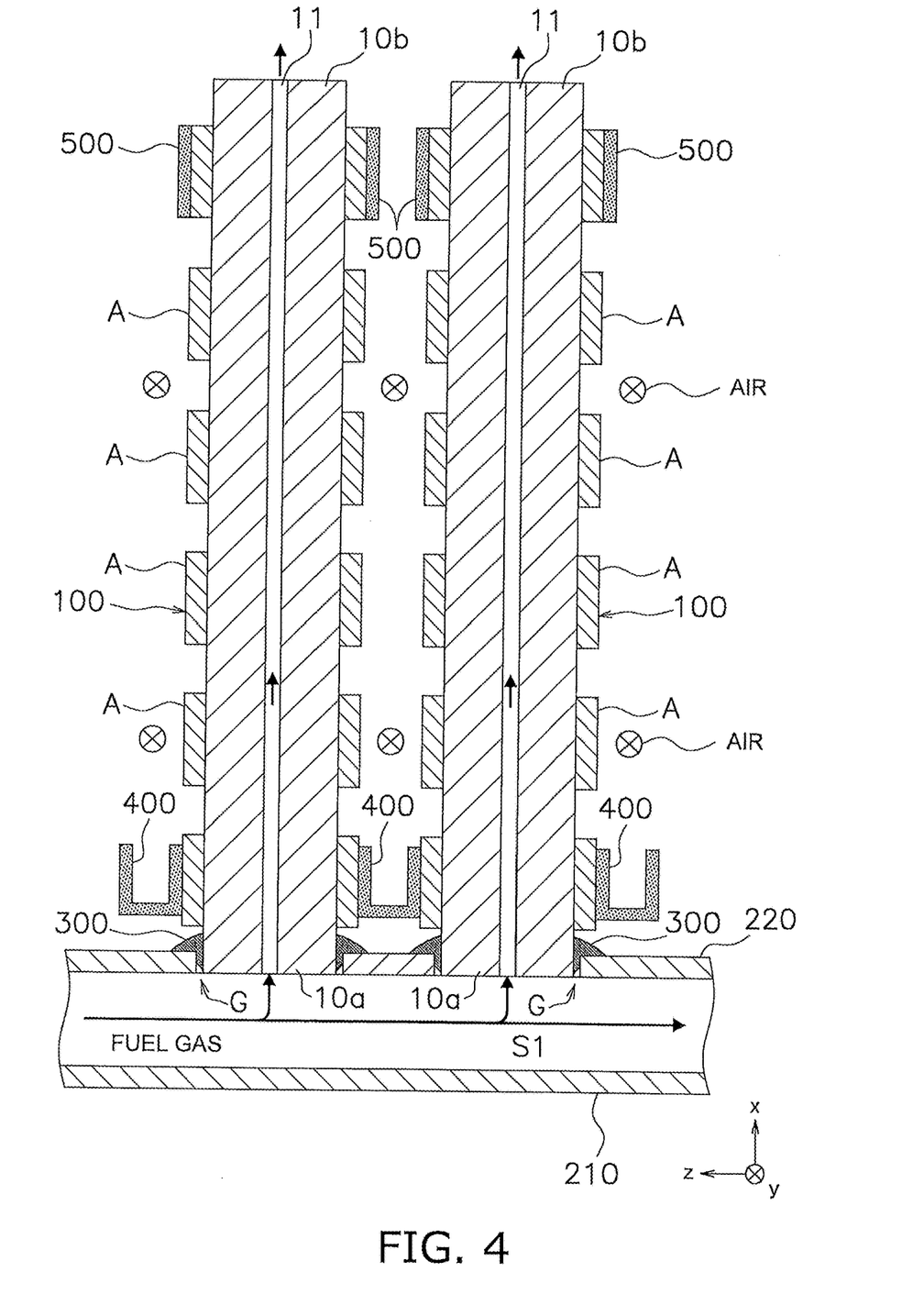
FIG. 4 is a partially enlarged sectional view of a fuel cell and a manifold.

The configuration of a fuel cell stack 1 according to the present embodiment will be describing making reference to the drawings. FIG. 1 is an overall perspective view of a fuel cell stack 1. FIG. 2 is an overall perspective view of a fuel cell 100. FIG. 3 is an overall perspective view of a manifold 200. FIG. 4 is a partially enlarged sectional view of a fuel cell 100 and a manifold 200.

The fuel cell stack 1 is a structure used in a solid oxide fuel cell (SOFC: solid oxide fuel cell). It is noted that in the present embodiment an x, y, z coordinate system is provided as illustrated in FIG. 1.

The fuel cell stack 1 includes a plurality of fuel cells 100, a manifold 200, and a glass portion 300. The manifold 200 and the glass portion 300 comprise a "joining structure" according to the present invention. The "joining structure" of the present invention may include a fuel cell 100.

Fuel Cell

As illustrated in FIG. 1, the respective fuel cells 100 are provided on the manifold 200. The fuel cells 100 are spaced apart from each other. As illustrated in FIG. 2 and FIG. 4, a base end 10a on the fuel gas inflow side with reference to the x axis direction (longitudinal direction) of the fuel cell 100 is bonded with the manifold 200 through the glass portion 300. The fuel cell 100 is an example of "a second bonded member" according to the present invention. The tip end 10b on the fuel gas discharge side with reference to the x axis direction of the fuel cell 100 is a free end.

As illustrated in FIG. 2, the fuel cell 100 has a substantially tabular configuration. The longitudinal direction, lateral direction and thickness direction of the fuel cell 100 respectively correspond to the x axis, y axis and z axis.

Although there is no particular limitation in relation to the length L1 in the x axis direction of the fuel cell 100, it may be set within a range of greater than or equal to 50 mm to less than or equal to 500 mm. Although there is no particular limitation in relation to the length L2 of the fuel cell 100 in the y axis direction, it may be set within a range of greater than or equal to 10 mm to less than or equal to 100 mm. Although there is no particular limitation in relation to the length L3 of the fuel cell 100 in the z axis direction, it may be set within a range of greater than or equal to 1 mm to less than or equal to 5 mm.

Each fuel cell 100 includes a plurality of power generating elements A, a supporting base plate 10 and a sealing film 20.

Each power generating element A has an anode, a solid electrolyte film, and a cathode. Each power generating element A is configured as a stacked fired body stacked in the order of anode, solid electrolyte film, and cathode. In this embodiment, the anode f may be configured from NiO (nickel oxide) and YSZ (8YSZ: yttria-stabilized zirconia) and so on. The solid electrolyte film may be configured from YSZ (8YSZ: yttria-stabilized zirconia). The cathode may be configured from LSCF ((La, Sr) (Co, Fe)$O_3$: lanthanum strontium cobalt ferrite).

The plurality of power generating elements A is provided on the supporting base plate 10. The plurality of power generating elements A is electrically connected in series. There is no particular limitation in relation to the number of the power generating elements A.

The supporting base plate 10 is a fired body configured from a porous material that does not exhibit electronic conductivity. The supporting base plate 10 is configured for example from CSZ (calcia-stabilized zirconia).

The supporting base plate 10 supports the power generating elements A. More specifically, a plurality of power generating elements A is provided with a predetermined spacing in the x axis direction on both principal surfaces of the supporting base plate 10.

A plurality of fuel gas passages 11 is formed in an inner portion of the supporting base plate 10. Each fuel gas passage 11 extends in the x axis direction. Each fuel gas passage 11 penetrates the supporting base plate 10. Each fuel gas passage 11 is formed with a predetermined spacing in the y axis direction (width direction).

The sealing film 20 covers the outer surface of the supporting base plate 10. The sealing film 20 may be configured from a dense material. The dense material includes for example YSZ, ScSZ, glass, or a spinel oxide, or the like. The sealing film 20 may be formed from the same material as the solid electrolyte film of each power generating element A. In that configuration, the sealing film 20 may be integrally formed with the solid electrolyte film of each power generating element A.

Manifold

The manifold 200 is an example of "a first bonded member" and "metal member" according to the present invention. The manifold 200 is a hollow body configured to supply fuel gas respectively to the plurality of fuel cells 100. As illustrated in FIG. 3 and FIG. 4, the manifold 200 has a substantially cuboid configuration. The height direction, lateral direction and longitudinal direction of the manifold 200 respectively correspond to the x axis direction, y axis direction and z axis direction.

As illustrated in FIG. 3 and FIG. 4, the manifold 200 has a base 210 and a supporting plate 220. The base 210 is configured from a metal material (for example, stainless steel, or the like). The base 210 has a bottom portion and side walls encircling the bottom portion. The bottom portion and side walls form an opening that opens in an upward direction.

The supporting plate 220 is configured from a metal material (for example, stainless steel, or the like). The supporting plate 220 is disposed on the base 210. More specifically, the supporting plate 220 is disposed on the tip end of the side wall of the base 210 and covers the opening of the base 210. In this manner, an inner space S1 is formed in the manifold 200 since the supporting plate 220 covers the opening of the base 210 (reference is made to FIG. 4). Fuel gas is introduced into the inner space S1.

The fuel gas is introduced through an introduction pipe 230 from the outside into the inner space S1. The introduction pipe 230 is configured from a metal material (for example, stainless steel, or the like). The introduction pipe 230 is bonded to the supporting plate 220 of the manifold 200.

As illustrated in FIG. 3 and FIG. 4, the manifold 200 supports each fuel cell 100. More specifically, the supporting plate 220 of the manifold 200 has a plurality of through holes 221. Each through hole 221 is formed in the supporting plate 220 to connect an outer side (outer space) with an inner space S1 of the manifold 200. More specifically, as illustrated in FIG. 4, each through hole 221 penetrates the supporting plate 220 in the x axis direction (height direction). As illustrated in FIG. 3, each through hole 221 is formed with a predetermined spacing in the z axis direction (longitudinal direction) and is also formed with a predetermined spacing in the y axis direction (lateral direction).

As illustrated in FIG. 4, the respective fuel cells 100 are disposed in each through hole 221. More specifically, the base end 10a of each fuel cell 100 is inserted into each through hole 221 to thereby connect the fuel gas passage 11 of each fuel cell 100 to the inner space S1.

Glass Portion

The glass portion 300 is configured for example from crystalline glass. Crystalline glass for example includes $SiO_2$—$B_2O_3$, $SiO_2$—CaO, MgO—$B_2O_3$, or $SiO_2$—MgO and so on. It is noted that $SiO_2$—MgO is most preferred as crystalline glass.

The crystalline glass used in this embodiment has a ratio of "volume occupied by crystalline phase" to total volume (crystallinity) of greater than or equal to 60%, and a ratio of "volume occupied by non-crystalline phase and impurities" to total volume (crystallinity) of less than 40%.

The glass portion 300 functions as a sealing member to prevent mixing of fuel gas of the inner space S1 of the manifold 200 with air in the outer space of the manifold 200. More specifically, as illustrated in FIG. 4, the glass portion 300 is disposed between the manifold 200 and each fuel cell 100 to thereby join the manifold 200 to each fuel cell 100. The glass portion 300 seals the cavity between the manifold 200 and each fuel cell 100. In this manner, the glass portion 300 partitions the inner space S1 from the outer space.

As illustrated in FIG. 4, the glass portion 300 fills the cavity G between each through hole 221 of the manifold 200 and each fuel cell 100.

Other Structure

As illustrated in FIG. 4, the fuel cell stack 1 further includes current collecting members 400, 500. The current collecting member 400 is disposed between adjacent fuel cells 100. In more detail, the current collecting member 400 is disposed between adjacent fuel cells 100 to thereby create an electrical connection in series of the anode of one fuel cell 100 with the cathode of another fuel cell 100. The current collecting member 400 is configured for example from metal mesh or the like.

The current collecting member 500 is provided on each fuel cell 100. In more detail, the current collecting member 500 is disposed on each adjacent fuel cell 100 to thereby create an electrical connection in series between the front surface and the back surface of each fuel cell 100.

Configuration of Joining Structure

Figure 5:
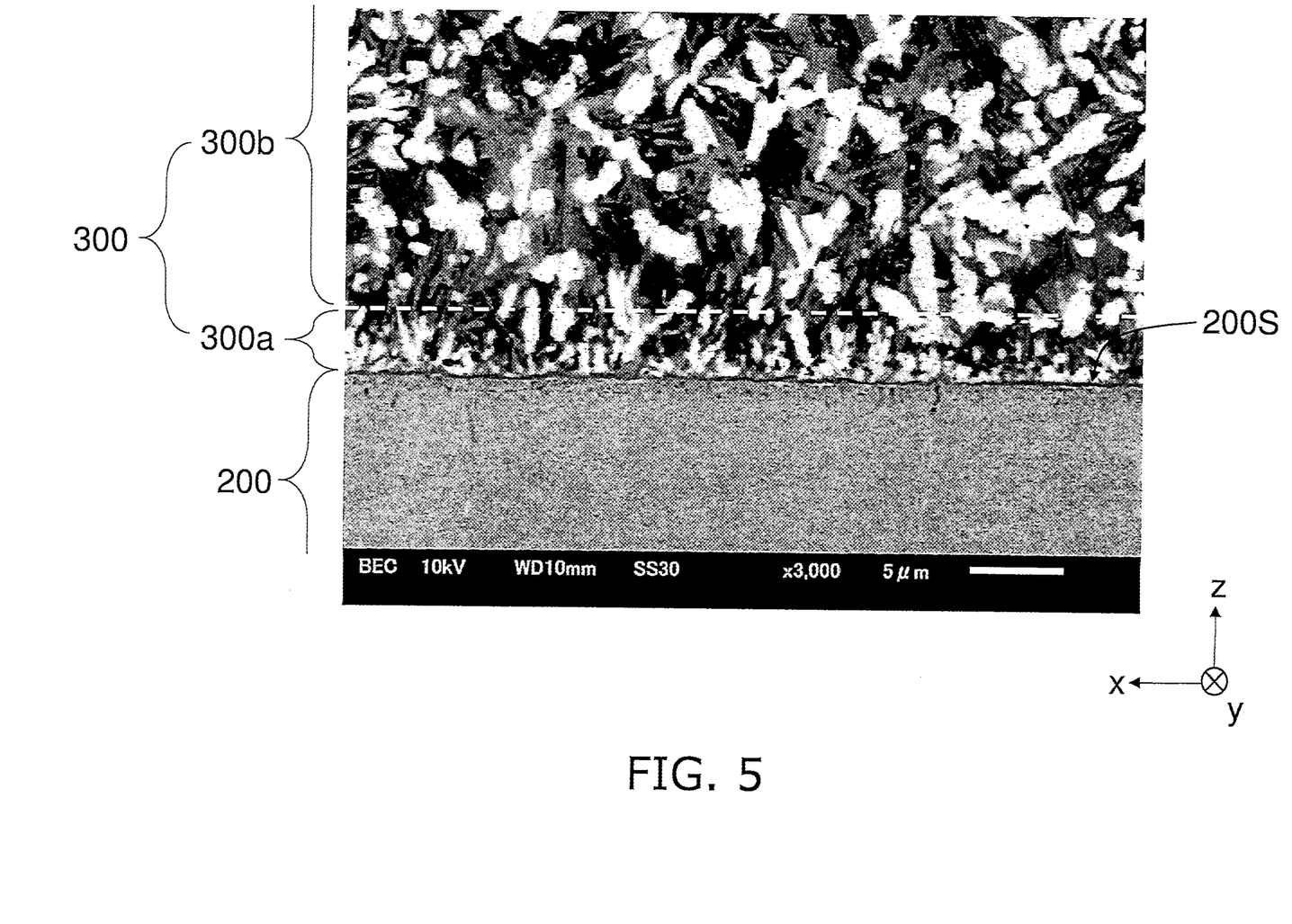
FIG. 5 is a backscattered electron image of a cross section of a joining structure using a scanning electron microscope.

Next, the configuration of "the joining structure" that is formed from the manifold 200 and the glass portion 300 will be described making reference to the drawings. FIG. 5 is a backscattered electron image of a cross section of the joining structure using a scanning electron microscope (SEM).

The manifold 200 includes a surface 200S. FIG. 5 illustrates a cross section that is substantially perpendicular to the surface 200S. In the present embodiment, although the surface 200S is formed in a substantially flat configuration, a slightly uneven configuration, or a completely or locally arcuate or inflectional configuration is also possible.

The glass portion 300 is connected to the surface 200S of the manifold 200. The glass portion 300 includes an interface region 300a and an inner region 300b at the cross-sectional surface that is perpendicular to the surface 200S of the manifold 200.

The interface region 300a is a region that is within 5 µm from the surface 200S of the manifold 200. The inner region 300b is a region that is more than 5 µm from the surface 200S of the manifold 200. Although there is no particular limitation on the scope of the inner region 300b, as discussed below, for the sake of calculating the characteristics of the crystal particles included in the inner region 300b in the present embodiment, the inner region 300b is defined as having a scope more than 5 µm and less than or equal to 100 µm from the surface 200S of the manifold 200.

It is noted that in FIG. 5, although the boundary of the interface region 300a and the inner region 300b is illustrated as a substantially straight line configuration, the actual configuration is defined by lines parallel to the surface 200S of the manifold 200.

The interface region 300a and the inner region 300b are respectively configured by a plurality of crystal particles. Although the backscattered electron image in FIG. 5 illustrates a mixture of white crystal particles, ash colored crystal particles and black crystal particles, the differences in the displayed color are due to the presence of slight mass difference of each crystal particle.

As illustrated in FIG. 5, the interface region 300a and the inner region 300b respectively include a plurality of rod-shaped crystal particles. In the present specification, the term rod-shaped crystal particle denotes a crystal particle that has three or more aspect ratios.

The rod-shaped crystal particles included respectively in the interface region 300a and the inner region 300b are defined using the following method. Firstly, a backscattered electron image enlarged with a magnification of 5000 times of the cross-sectional surface of the interface region 300a that is perpendicular to the surface 200S of the manifold 200 is obtained using a SEM (model: ULTRA55) manufactured by Zeiss AG) provided with a backscattered electron detector. Next, particles on the backscattered electron image that are displayed most clearly (that is to say, particles displayed with the highest intensity) are specified. Then, an electron diffraction pattern for the particles that are displayed most clearly are obtained using scanning transmission electron microscopy (STEM) to thereby confirm that the particles that are displayed most clearly are crystal particles. Next, the respective aspect ratios for the particles that are displayed most clearly are calculated by dividing the maximum Ferret diameter by the minimum Ferret diameter for the crystal particles to thereby specify rod-shaped crystal particles having three or more aspect ratios. The maximum Ferret diameter is the maximum distance between two parallel straight lines when a crystal particle is sandwiched by two parallel straight lines on the backscattered electron image. The minimum Ferret diameter is the minimum distance between two parallel straight lines when a crystal particle is sandwiched by two parallel straight lines on a backscattered electron image.

The average orientation angle of the rod-shaped crystal particles included in the interface region 300a is greater than or equal to 60 degrees and less than or equal to 120 degrees. In this manner, the rod-shaped crystal particles included in the interface region 300a can have an upright configuration relative to the surface 200S of the manifold 200. Thermal expansion or thermal contraction in the manifold 200 tends to result in crack formation in the interface region 300a in a direction along the surface 200S. However, crack formation along the surface 200S can be inhibited since the rod-shaped crystal particles have an upright configuration relative to the surface 200S of the manifold 200.

The average orientation angle of the rod-shaped crystal particles included in the interface region 300a is more preferably greater than or equal to 70 degrees and less than or equal to 110 degrees. In this manner, it is possible to further inhibit cracking along the surface 200S.

There is no particular limitation in relation to the average orientation angle of the rod-shaped crystal particles included in the inner region 300b. As discussed below, the rod-shaped crystal particles may be randomly disposed in the inner region 300b relative to the interface region 300a, or the average orientation angle of the rod-shaped crystal particles included in the inner region 300b may be greater than or smaller than, or may be the same as the average orientation angle of the rod-shaped crystal particles included in the interface region 300a.

The average orientation angle of the rod-shaped crystal particles included in the interface region 300a is measured using the following method. Firstly, the rod-shaped crystal particles in the interface region 300a are specified using the method described above. Then. 30 rod-shaped crystal particles are randomly selected from the interface region 300a. Next, for each of the selected 30 rod-shaped crystal particles, the angle formed by the direction parallel to the two straight lines defining the minimum Ferret diameter with respect to the straight line approximating the surface 200S by the least squares method was measured as the orientation angle for each of the 30 selected rod-shaped crystal particles. At that time, the orientation angle is measured at one side of the direction parallel to two straight lines that define the minimum Ferret diameter (for example, the angle on the left side of FIG. 5). In addition, the average orientation angle of the rod-shaped crystal particles included in the interface region 300a is calculated by obtaining the average of the respective orientation angles for the 30 rod-shaped crystal particles.

The average orientation angle of the rod-shaped crystal particles included in the inner region 300b is measured using the same method as that used for the average orientation angle of the rod-shaped crystal particles included in the interface region 300a as described above.

The standard deviation of the orientation angle of the plurality of rod-shaped crystal particles included in the inner region 300b is greater than the standard deviation of the orientation angle of the plurality of rod-shaped crystal particles included in the interface region 300a. That is to say, in the inner region 300b, when compared to the interface region 300a, the rod-shaped crystal particles are disposed in a random configuration. For that reason, when operating the fuel cell stack 1, even when cracks form in the interface region 300a as a result of the thermal expansion or thermal contraction of the manifold 200, it is possible to inhibit a crack from reaching the outer space. Therefore, it is possible to inhibit an adverse effect on seal characteristics resulting from cracks forming through the glass portion 300.

The standard deviation of the orientation angle of the rod-shaped crystal particles included in the interface region 300a is obtained by calculating the standard deviation of the orientation angle respectively for the 30 rod-shaped crystal particles that were selected to calculate the average orientation angle of the rod-shaped crystal particles.

The standard deviation of the orientation angle of the rod-shaped crystal particles included in the inner region 300b is measured using the same method as that used for the standard deviation of the orientation angle respectively for the rod-shaped crystal particles included in the interface region 300a that was described above.

There is no particular limitation in relation to the value for the standard deviation of the orientation angle of the rod-shaped crystal particles included in the interface region 300a and for example, it may take a value of less than or equal to 30. The value for the s standard deviation of the orientation angle of the rod-shaped crystal particles included in the interface region 300a is preferably less than or equal to 15. In this manner, since strength in a direction along the surface 200S is enhanced by uniformity in the orientation angle of each rod-shaped crystal particle in the interface region 300a, crack formation along the surface 200S can be inhibited. Since uniformity in the orientation angle of each rod-shaped crystal particle in the interface region 300a is preferred, although there is no limitation in relation to lower limiting value for the standard deviation of the rod-shaped crystal particles included in the interface region 300a, it may take a value of greater than or equal to 5.

There is no particular limitation in relation to the value for the standard deviation of the orientation angle of the rod-shaped crystal particles included in the inner region 300b and for example, it may take a value of greater than or equal to 40. The value for the standard deviation of the orientation angle of the rod-shaped crystal particles included in the inner region 300b is preferably greater than or equal to 50. In this manner, crack formation in the interface region 300a that reaches into the inner region 300b can be inhibited. Since more random orientation angles in the rod-shaped crystal particles included in the inner region 300b are preferably, although there is no limitation in relation to upper limiting value for the standard deviation of the orientation angle of the rod-shaped crystal particles included in the inner region 300b, it may take a value of less than or equal to 60.

As illustrated in FIG. 5, the average particle diameter of the crystal particles included in the interface region 300a is preferably smaller than the average particle diameter of the crystal particles included in the inner region 300b. In this manner, the strength of the interface region 300a in the glass portion 300 can be enhanced. Consequently, when operating the fuel cell stack 1, crack formation in the interface region 300a can be inhibited even when thermal stress resulting from thermal expansion and thermal contraction in the manifold becomes concentrated in the interface region 300a. Furthermore, there is no necessity to use excessively fine seed crystals to form the inner region 300b and it is possible to prevent initiation of crystallization from occurring too early in the firing step of the inner region 300b. Therefore, since it is possible to prevent reduced flow that is caused by a reduction in flow characteristics in the inner region 300b, the shape of the inner region 300b can be easily controlled. As a result, it is possible to enhance the seal characteristics of the inner region 300b. In light of the disclosure above, both crack inhibition and enhancement of seal characteristics can be achieved in the glass portion 300.

The average particle diameter of the crystal particles contained in the interface region 300a is preferably less than or equal to 0.8 times the average particle diameter of the crystal particles contained in the inner region 300b, more preferably less than or equal to 0.6 times, and in particular preferably less than or equal to 0.4 times. In this manner, crack formation in the interface region 300a can be further inhibited.

Although there is no particular limitation in the average particle diameter of the crystal particles contained in the interface region 300a, it may be configured as greater than or equal to 0.2 μm and less than or equal to 2.5 μm. Although there is no particular limitation in the average particle diameter of the crystal particles contained in the inner region 300b, it may be configured as greater than or equal to 3 μm and less than or equal to 20 μm.

The average particle diameter of the crystal particles contained in the interface region 300a is measured using the following method. Firstly, a backscattered electron image enlarged with a magnification of 5000 times of the cross-sectional surface of the interface region 300a that is perpendicular to the surface 200S of the manifold 200 is obtained using an FE-SEM (model: ULTRA55) manufactured by Zeiss AG) that uses a backscattered electron detector. Next, particles are specified on the backscattered electron image that are displayed most clearly (that is to say, particles displayed with the highest intensity). Then, an electron diffraction pattern for the particles that are displayed most clearly is obtained using scanning transmission electron microscopy (STEM) to thereby confirm that the particles that are displayed most clearly are crystal particles. Next, 30 crystal particles that are displayed most clearly are randomly selected from the interface region 300a to thereby calculate the diameter of a circle that has the same cross-sectional area as each crystal particle (referred to below as "equivalent circle diameter"). Then the arithmetic average of the equivalent circle diameter for each crystal particle is calculated (referred to below as "average equivalent circle diameter"), and that average equivalent circle diameter is taken to be the average particle diameter of the crystal particles contained in the interface region 300a. However, when measuring the average particle diameter of the crystal particles, those crystal particles that overlap on the boundary of the interface region 300 and the inner region 300b are excluded from the measurement details for the average particle diameter. Furthermore, when measuring the average particle diameter of the crystal particles, fine crystal particles having an equivalent circle diameter of less than or equal to 0.03 μm are excluded from the measurement objects for the average particle diameter.

The average particle diameter of the crystal particles contained in the inner region 300b is measured using the same method as that used for the average particle diameter of the crystal particles contained in the interface region 300a as described above.

Assembly of Fuel Cell Stack

Firstly, an interface region bonding material containing a rod-shaped seed crystal consisting of at least one element (or oxide) of Ba, Ca, Mg, Al, La, Ti, Cr, Zr, Ce and B is coated using screen printing onto a region of the manifold 200 that is bonded to the glass portion 300. In this manner, the rod-shaped seed crystals are distributed in an upright configuration on the surface of the manifold 200. At that time, the standard deviation of the orientation angle and the average orientation angle of the rod-shaped crystal particles in the interface region 300a as described below can be adjusted by adjusting the size of the opening of the plate used in the screen printing process. For example, a smaller plate opening results in a larger average orientation angle of the rod-shaped crystal particles. A smaller plate opening results in a smaller standard deviation of the orientation angle of the rod-shaped crystal particles.

Next, a compact for the interface region 300a is fabricated in relation to the glass portion 300 by drying the coated interface region bonding material.

Next, a plurality of fuel cells 100 are fixed and aligned using a designated jig into a stacked configuration and the base end 10a of each fuel cell is inserted to the respective through holes 221 of the manifold 200.

Next, an inner region bonding material containing a rod-shaped seed crystal consisting of at least one element (or oxide) of Ba, Ca, Mg, Al, La, Ti, Cr, Zr, Ce and B is filled using a dispenser into the space between the fuel cells 100 and the manifold 200. In this manner, the rod-shaped seed crystals contained in the interface region bonding material can be distributed in a random orientation.

Next, the compact for the glass portion 300 is thermally treated (750 to 900 degrees C., 1 to 10 hours). The thermal treatment causes the rod-shaped seed crystals that are oriented in an upright configuration relative to the surface of the manifold 200 in the interface region 300a to grow in a direction away from the surface of the manifold 200 and become rod-shaped crystal particles. Consequently, rod-shaped crystal particles are formed in the interface region 300a with an average orientation angle of greater than or equal to 60 degrees to less than or equal to 120 degrees. On the other hand, rod-shaped seed crystals that have a random orientation respectively grow in the inner region 300b and become rod-shaped crystal particles. Consequently, randomly oriented rod-shaped crystal particles grow in the inner region 300b. As a result, the standard deviation of the orientation angle of rod-shaped crystal particles in the inner region 300b becomes greater than the standard deviation of the orientation angle of rod-shaped crystal particles in the interface region 300a. It is noted that the aspect ratio of the rod-shaped crystal particles respectively on the interface region 300a and the inner region 300b increases as the processing time of the thermal treatment is increased.

Other Embodiments

Although the embodiments of the present invention have been described, the present invention is not limited to those embodiments, and various changes or modifications may be added within a scope that does not depart from the scope of the invention.

(A) In the above embodiment, although the joining structure of the present invention was applied to a fuel cell stack provided with fuel cells, the joining structure of the present invention may be applied to a fuel cell stack provided with an electrochemical cell such as an electrolytic cells or the like that produces hydrogen and oxygen from steam.

(B) In the above embodiment, the fuel cell 100 is a segmented-in-series type fuel cell, that is to say, a plurality of power generating elements A are aligned with the longitudinal direction of supporting base plate 10. However, there is no limitation in relation to the configuration of the fuel cell 100 and the fuel cell 100 may for example take various configurations such as flat-tubular type, flat type or cylindrical type.

(C) In the above embodiment, the "joining structure" of the present invention is configured to include a manifold 200 as "a first bonded member" that is bonded to the glass portion 300. However, there is no limitation in this regard, and the "first bonded member" may be a member other than the manifold 200.

(D) In the above embodiment, the "joining structure" according to the present invention is configured to include a fuel cell 100 as "a second bonded member" that is bonded to the glass portion 300. However, there is no limitation in this regard, and the "second bonded member" may be a member other than the fuel cell 100.

(E) Although the above embodiment does not include any specific disclosure in this regard, the configuration of the interface region of the glass portion 300 with the fuel cell 100 may be the same as that of the interface region 300a, or may be the same as the inner region 300b.

(F) In the above embodiment, the base end 10a of each fuel 100 is inserted into each through hole 221 of the manifold 200, the base ends 10a may be disposed on the outer side of each through hole 221. In such a configuration, the base end 10a of each fuel cell 100 is fixed to the manifold 200 through a glass seal portion 300 at a position that is separated from each through hole 221.

The invention claimed is:

1. A joining structure comprising:
a first bonded member; and
a glass portion bonded to a surface of the first bonded member, wherein
the glass portion includes an interface region not exceeding 5 μm from the surface of the first bonded member, and an inner region more than 5 μm from the surface of the first bonded member,
the interface region and inner region respectively include rod-shaped crystal particles that have three or more aspect ratios when viewed in cross section,
an average orientation angle of the rod-shaped crystal particles included in the interface region is greater than or equal to 60 degrees and less than or equal to 120 degrees, and
a standard deviation of orientation angle of the rod-shaped crystal particles included in the inner region is greater than a standard deviation of orientation angle of the rod-shaped crystal particles included in the interface region.

2. The joining structure according to claim 1, wherein the first bonded member is a metal member.

3. The joining structure according to claim 1 further comprising:
a second bonded member bonded to the first bonded member through the glass portion, wherein
the glass portion seals a gap between the first bonded member and the second bonded member.

* * * * *